US010769227B2

(12) United States Patent
Tu et al.

(10) Patent No.: US 10,769,227 B2
(45) Date of Patent: Sep. 8, 2020

(54) INCENTING ONLINE CONTENT CREATION USING MACHINE LEARNING

(71) Applicant: Microsoft Technology Licensing, LLC, Redmond, WA (US)

(72) Inventors: Ye Tu, San Carlos, CA (US); Yiping Yuan, Sunnyvale, CA (US); Chun Lo, Mountain View, CA (US); Shaunak Chatterjee, Sunnyvale, CA (US); Yijie Wang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 16/241,649

(22) Filed: Jan. 7, 2019

(65) Prior Publication Data

US 2020/0218770 A1  Jul. 9, 2020

(51) Int. Cl.
*G06F 15/16* (2006.01)
*G06F 16/954* (2019.01)
*G06F 16/953* (2019.01)
*G06Q 50/00* (2012.01)
*G06N 20/00* (2019.01)
*H04L 29/08* (2006.01)

(52) U.S. Cl.
CPC .......... *G06F 16/954* (2019.01); *G06F 16/953* (2019.01); *G06N 20/00* (2019.01); *G06Q 50/01* (2013.01); *H04L 67/22* (2013.01)

(58) Field of Classification Search
CPC ..... G06F 16/954; G06F 16/953; G06N 20/00; G06Q 50/01; H04L 67/22
USPC ........................................................ 709/203
See application file for complete search history.

(56) References Cited

U.S. PATENT DOCUMENTS

2017/0171139 A1*   6/2017  Marra .................... H04L 67/22

* cited by examiner

*Primary Examiner* — Wing F Chan
*Assistant Examiner* — Joseph R Maniwang
(74) *Attorney, Agent, or Firm* — Schwegman Lundberg & Woessner, P.A.

(57) ABSTRACT

A machine for content-feedback-based machine learning to incent online content creation. The machine accesses a relevance value that identifies a level of relevance of a content item to a user. The content item is created by a content creator. The machine generates, using a machine learning model, a feedback sensitivity score associated with the content creator. The machine generates, based on the relevance value and a product between the feedback sensitivity score and a likelihood of the user providing a feedback signal in relation to the content item, a ranking score for the content item. The machine causes display of the content item, based on the ranking score, in a user interface of a client device associated with the user. An input pertaining to the content item received via the user interface causes improvement of the machine learning model based on updating the one or more feedback features.

20 Claims, 7 Drawing Sheets

502 — DETERMINE THE RELEVANCE VALUE BASED ON A SUM OF A PROBABILITY VALUE OF A CLICKTHROUGH BY THE USER ON THE CONTENT ITEM, AND A PRODUCT BETWEEN A PROBABILITY VALUE OF THE USER SHARING, LIKING, OR COMMENTING ON THE CONTENT ITEM, AND A DOWNSTREAM IMPACT VALUE THAT IDENTIFIES AN IMPACT OF THE CONTENT ITEM ON A NUMBER OF SHARING, LIKING, OR COMMENTING INSTANCES BASED ON A LEVEL OF INFLUENCE BY THE CONTENT CREATOR ON ONE OR MORE USERS 402
404
406
408

FIG. 5

INCENTING ONLINE CONTENT CREATION USING MACHINE LEARNING

TECHNICAL FIELD

The present application relates generally to systems, methods, and computer program products that utilize machine learning to incent online content creation.

BACKGROUND

Some personalized searches involve analyzing the user characteristics against a corpus of possible results to find the best options for a user. For example, an online content search may generate different results for different users depending on their background, education, experience, etc. Sometimes, users' actions online are considered during the selection of what online content to display to the users.

However, the number of users of an online service may be in the millions, and the categories of data associated with the users (e.g., educational institutions, current jobs, online content, etc.) may also be into the thousands or millions. Identifying online content that satisfies the interests of content consuming users and of creating users may be a computationally expensive proposition given the large amount of data and possible categories, thereby resulting in a technical problem of excessive consumption of the electronic resources of a computer system performing the search.

BRIEF DESCRIPTION OF THE DRAWINGS

Some embodiments are illustrated by way of example and not limitation in the figures of the accompanying drawings, in which:

FIG. 5 is a flowchart illustrating a method for content-feedback-based machine learning to incent online content creation, and representing an additional step of FIG. 4, according to some example embodiments;

DETAILED DESCRIPTION

Figure 1:
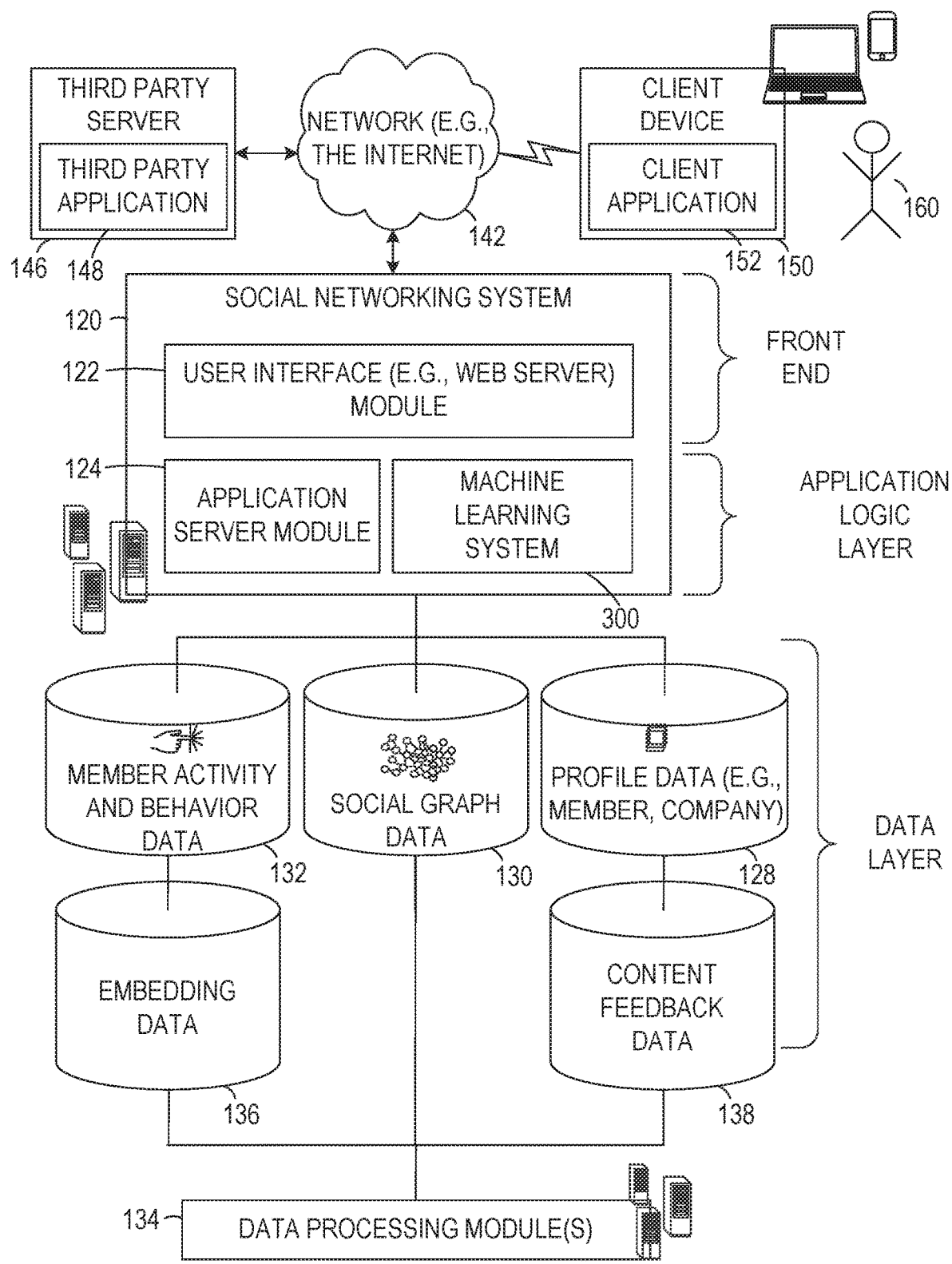
FIG. 1 is a network diagram illustrating a client-server system, according to some example embodiments.

Example methods and systems for machine learning of online feedback to previously published online content in order to incent online content creation are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Digital content is ubiquitous in multiple avenues of an online service—as a part of a flagship feed, interest feed, emails, notifications, and other products. An example of an online service is a social network service (e.g., LinkedIn® professional networking services). Despite the omnipresence of digital content items on an online service, a technical problem associated with providing relevant digital content to users of the online service is the automatic selecting and presenting of digital content items based on optimizing both the utility to the user who consumes the digital content and the utility to the content creator. For example, in the context of a social networking system (hereinafter also "SNS") that provides professional networking services (e.g., job-finding or recruiter services) or informational services (e.g., education courses, news, or career-related information), many users of online content could benefit from receiving online content that is relevant to them at the particular time they are browsing a website of the SNS. A content creator (e.g., an article author, a blogger, or an influencer) who publishes online content on the SNS may find it useful to receive feedback (e.g., likes, shares, or comments) to the online content generated by him or her. The feedback received to previously posted online content allows the content creator to build up his or her reputation and provides incentive to generate new online content. Machine-initiated or user-requested searches of online content often utilize user-related data from a user's profile. However, user profile data may be lacking information that helps identify utility to content creators, which may lead to inefficient use of the electronic resources of a computer system performing searches for content that balances the utility to the content consumer and the content creator.

In some example embodiments, the content ecosystem in a social networking system can be viewed as a two-sided marketplace of content creators and consumers. The newsfeed (hereinafter also "feed") and notifications interfaces are two example channels used by consumers to engage with content from the creators on the SNS. In some example embodiments, a machine learning model is used to improve the content creator experience based on machine learning of the feedback received from their consumer audience.

One motivation to create associated with content creators is to hear from their desired audience. Improving the creator experience, by getting the content creators more feedback from the right consumers, provides an incentive to generate new content and to provide a platform to content creators new to the SNS. In some example embodiments, a creator-focused machine learning model is leveraged to modify the consumer feed ranking to better balance the consumer interests with the creator values. A machine learning model which better predicts how feedback affects a creator's future creation behavior can be effectively used as a proxy to represent creator interests during feed ranking for consumers.

In some example embodiments, the aim of this machine learning model (hereinafter also "Pcreate model") is twofold. First, the machine learning system predict members' creation activities and how such activities differ across different segments or personalized features. The probabilistic quantities generated by the machine learning system are $P_i(create)$, the probability of member i making at least one contribution in a given time period, and $E_i$(create), the expected number of contributions from member i in a given time period. Second, the machine learning system learns what factors drive content creation activities and how each factor affects individual members. In other words, the machine learning system learns causal effects that lead to actionable intervention strategies to boost contributions or unique contributors. Other probabilistic quantities generated by the machine learning system are $\Delta P_i$(create) and $\Delta E_i$(create), which are the predicted changes in $P_i$(create) and $E_i$(create) given an intervention, for example, of getting one more feedback.

Notations and Definitions t is the timestamp (consider discrete time intervals, say daily/weekly), e.g., day t and day t+1.

$Y_{i,t}$ is the content creation of user i at time t.

$X_{i,t}$ is the member features of user i at time t.

a. $Z_{i,t} \subseteq X_{i,t}$ is the treatment heterogeneous features (such as feedback-mlc interaction, feedback-pastContribution interaction) of user i at time t.

i. $a_{i,t} \in X_{i,t}$ is the number of feedback items that user i received in last n (n=3) days.

ii. $a_{i,t}, S_{i,t} \subseteq X_{i,t}$ is the other treatment heterogeneous features (feedback related interaction terms) of user i at time t. ($Z_{i,t} = a_{i,t} \cup S_{i,t}$, $S_{i,t} \subseteq V_{i,t}$)

b. $V_{i,t} \subseteq X_{i,t}$ is the other features of user i at time t ($V_{i,t} \cap Z_{i,t} = \emptyset$).

$P(Y_{i,t} > 0 | X_{i,t}) = P(Y_{i,t} > 0 | a_{i,t}, S_{i,t}, V_{i,t})$ the probability of user i create a content at time t given all features.

$\Delta P(Y_{i,t} > 0 | \Delta a_{i,t}, S_{i,t}, V_{i,t}) = P(Y_{i,t} > 0 | (a_{i,t} + \Delta a_{i,t}), S_{i,t}, V_{i,t}) - P(Y_{i,t} > 0 | a_{i,t}, S_{i,t}, V_{i,t})$ is the delta Pcreate given delta feedback.

Utilizing the Pcreate Model to Provide Content in a User's Feed $$\text{Objective} = P_{ctr} + \alpha * P_{viral} * E_{DSI} + \beta * P_{response} * V_{actor}$$

$P_{ctr}$ represents the probability of member j clicks content k $P_{viral}$ represents the probability of member j like/share/comment content k $E_{DSI}$ represents the expectation of downstream interactions will be triggered conditional on member j has distributed (like/share/comment) the content $P_{response}$ represents the probability of member j respond to the content k (e.g: like and comment on it)

$V_{actor}$ represents the utility of the content creator i would receive if receiving the response from member j $V_{actor}$ is defined as the incremental utility the creator would obtain from receiving one more feedback. Below are two approaches for generating $V_{actor}$.

Approach 1: Estimating member-level feedback sensitivity rate ($\tau_i$) from the Pcreate model $V_{actor} = e^{\tau_i a}$, where a represents the expectation of feedback received The Pcreate model does not yield an estimation of $\tau_i$ directly. Instead, the Pcreate gives a non-parametric estimation of $V_{actor}$, which is the delta Pcreate, and a, the number of feedback received. For a sequence of possible values for $\alpha$, $\xi_0, \ldots, \xi_k$ are chosen to be consistent with the way the feedback feature is bucketized, $$w_{i,j} = \Delta P(Y_i > 0 | a_i = \xi_j, \Delta a_i = 1, S_i, V_i), j = 1, \ldots, k$$

If it is assumed the relationship follows exponential decay, then $w_{i,j} = e^{\tau_i \xi_j}$ $\log(w_{i,j}) = \tau_i \xi_j$ $\xi_j \in \Re^{k+1}$, as we have k cut off points $$\tau_i = (\mu_i \mu_i^T)^{-1} \mu_i \log(w_i)$$

For each member, the machine learning system scores k+1 times to get delta Ecreate at each feedback level. Then, the machine learning system estimates $\tau_i$ using above analytical solution.

Approach 2: The machine learning system can push $\Delta P(Y_i > 0 | Z_i, \Delta a_i = 1)$ as an actor side feature for each of the k+1 feedback levels and for each member i.

Utilizing the Pcreate Model to Identify Possible Connections for Users or to Suggest People to Follow on the SNS When considering whether any two users should be recommended as connections to each other or as people to follow on the online service, the machine learning system determines the likelihood of two users of the online service giving feedback to each other and the impact on the likelihood of the users to create new content.

A machine learning system may provide a technical solution to the technical problem of automatic selecting and presenting of digital content items based on optimizing both the utility to the user who consumes the digital content and the utility to the content creator. For instance, the machine learning system accessing a relevance value. The relevance value identifies a level of relevance of a content item to a user, the content item being created by a content creator for publication on an online social networking service. The machine learning system generates, using a machine learning model, a feedback sensitivity score associated with the content creator, the machine learning model using one or more feedback features identifying feedback signals received for one or more previously created content items. The machine learning system generates, based on the relevance value and a product between the feedback sensitivity score and a likelihood of the user providing a feedback signal in relation to the content item, a ranking score for a content item created by the content creator. The machine learning system causes display of the content item in a user interface of a client device associated with the user. The user interface displays the content item in relation to other content items based on the ranking score for the content item. An input pertaining to the content item received via the user interface causes improvement of the machine learning model based on updating the one or more feedback features used by the machine learning model to indicate the received input.

In some example embodiments, the machine learning system determines the relevance value based on a sum of a probability value of a clickthrough by the user on the content item, and a product between a probability value of the user sharing, liking, or commenting on the content item, and a downstream impact value that identifies an impact of the content item on a number of sharing, liking, or commenting instances based on a level of influence by the content creator on one or more users.

In various example embodiments, the content item is a first content item, and the generating of the feedback sensitivity score, by the machine learning system includes, determining an increase in a probability of creating a second content item in response to an increase in a probability of receiving a feedback signal in relation to the first content item. The probability of receiving the feedback signal in relation to the first content item is determined based on training the machine learning model using one or more features pertaining to at least one of user profiles or user behavior and activity associated with one or more members of the online social networking service. The one or more features include at least one of a type of feedback received previously, a count of each type of feedback, a number of content items the content creator generated previously, types of activities that the content creator has engaged in previously, past session data, past sharing data, one or more identifiers of sources of content that the content creator shared, an indicator that shared content included at least one of an image, rich media, or a hash tag, a number of notifications received by the content creator, a number of connections the content creator has via the online social networking service, a number of active connections the content creator has via the online social networking service, identifiers of profile features, an identifier of language preference, a job title, a job seniority, a gender, a student identifier, a job seeker identifier, or a recruiter identifier.

In some example embodiments, the features (hereinafter also "attributes") are used for training machine learning models (e.g., deep learning machine training models) for generating search facets for performing personalized searches that identify content items for users of the online service. In machine learning, a feature is an individual measurable property or characteristic of a phenomenon being observed. For example, in the context of the online service, features of similar user profiles are inputs to machine learning models that generate search facets relevant to a particular user, and identify content that the particular user may be interested in.

In various example embodiments, using expressive features in deep learning models to understand content, as well as users' preferences for content not only provide a richer experience to the user, but also enhances machine learning tools for digital content processing and understanding. Further, content representation learning improves data processing efficiency and data storage.

Deep learning refers to a class of techniques used to model a response by generating complex data transformations and abstractions using multi-layer neural networks. Deep learning can support a vast array of applications, ranging from response prediction, feature generation, natural language understanding, speech or image recognition, and understanding.

Deep learning techniques may be used in modeling a user's response when a machine learning system recommends one or more digital content items to a user. Often a user's response to a recommended content is a function of a relevance of the digital content item to the user's interests, context, or timing of the presentation of the digital content. Many relevance problems aim at identifying, predicting, or searching something for the user, such as finding a job that would interest the user. In some example embodiments, relevance helps identify the things that are appropriate for the user based on the user features and one or more types of similarities. For example, a job search engine may find jobs that would be interesting for the user because "similar" users have explored those jobs. However, finding similarities among users, among users and jobs, users and articles, users and advertisements, etc., are complex problems, especially in a system where there could be millions of users, jobs, articles, and advertisements.

In machine learning, categorical features are those features that may have a value from a finite set of possible values. In some example embodiments, categorical features include skills of the user, title of the user, industry of the user, company of the user, and educational institutions attended by the user.

In some example embodiments, similarities may be identified by converting categorical values to vectors (a process referred to herein as "embedding") and then utilizing tools well-suited for operating on vectors. However, a simple vector definition where each value of the category is assigned a position within the vector (a representation sometimes called "bag of words") results in very large vectors with very sparse values (e.g., a single 1 among 35,000 values). Because such vectors are difficult to work with, reducing the size of the vectors, in some instances, is important.

In some example embodiments, obtaining vectors with an embedded semantic meaning is important because similarity analysis is simplified using the embedded semantic meaning. For example, two vectors being close to each other indicates that the two vectors represent two categorical values that are similar.

A machine learning system may utilize embeddings to provide a lower dimensional representation of different features, and can learn the embeddings along with the model parameters. In certain example embodiments, a deep learning model for response prediction is characterized using three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. The response layer may be a Sigmoid function.

An example method and system for incenting generation of online content, by online content creators, based on machine learning of feedback received to previously generated online content may be implemented in the context of the client-server system illustrated in FIG. 1. As illustrated in FIG. 1, the machine learning system 300 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android®, Windows' Phone).

For example, client device(s) 150 may be executing client application(s) 152. The client application(s) 152 may provide functionality to present information to the user and communicate via the network 142 to exchange information with the social networking system 120. Each of the client devices 150 may comprise a computing device that includes at least a display and communication capabilities with the network 142 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online content consumption event associated with the member (e.g., an online content item viewed by the member), the date and time when the online content consumption event took place, an identifier of the creative associated with the online content consumption event, a source identifier of the creative associated with the online content item, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include the machine learning system 300, which is described in more detail below.

Further, as shown in FIG. 1, a data processing module 134 may be used with a variety of applications, services, and features of the social networking system 120. The data processing module 134 may periodically access one or more of the databases 128, 130, 132, 136, or 138, process (e.g., execute batch process jobs to analyze or mine) profile data, social graph data, member activity and behavior data, embedding data, or content feedback data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
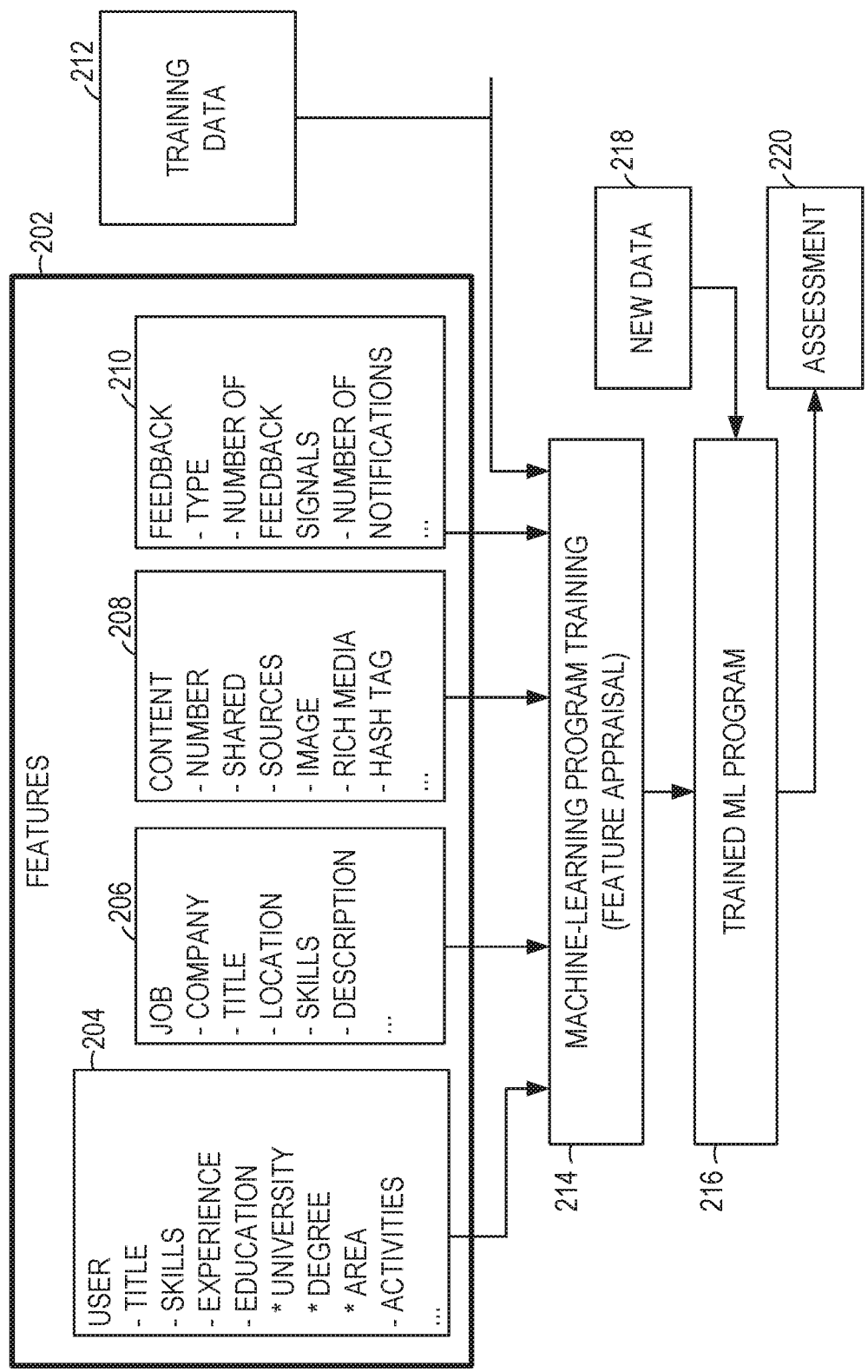
FIG. 2 illustrates the training and use of a machine-learning program, according to some example embodiments.

FIG. 2 illustrates the training and use of a machine-learning program, according to some example embodiments. In some example embodiments, machine-learning programs (MLP), also referred to as machine-learning algorithms or tools, are utilized to perform operations associated with analyzing, categorizing, or identifying data, such as analysis of content feedback data or user behavior data, or performing searches, such as digital content (e.g., articles, jobs, etc.) searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 212 in order to make data-driven predictions or decisions expressed as outputs or assessments 220. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

In general, there are two types of problems in machine learning: classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a feedback sensitivity score (e.g., a number from 1 to 100) associated with an online content creator. The feedback sensitivity score is determined by a machine learning model using one or more feedback features identifying feedback signals for one or more previously created content items. In certain embodiments, example machine-learning algorithms provide a ranking score (e.g., a number from 1 to 100) for a content item created by the content creator. The ranking score is determined by a machine learning model based on various content-user relevance features as well as the one or more feedback features identifying feedback signals for one or more previously created content items. The machine-learning algorithms utilize the training data 212 to find correlations among identified features 202 that affect the outcome.

The machine-learning algorithms utilize features for analyzing the data to generate assessments 220. A feature 202 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 202 may be of different types and may include one or more of user features 204, job features 206, content features 208, and feedback features 210. The user features 204 may include one or more of the data in the user profile 128, as described in FIG. 1, such as title, skills, endorsements, experience, education, a number of connections the content creator has via the online social networking service, a number of active connections the content creator has via the online social networking service, identifiers of profile features, an identifier of language preference, a job seniority, a gender, a student identifier, a job seeker identifier, or a recruiter identifier, and the like. The job features 206 may include any data related to the job. The content features 208 may include any data related to various content items (e.g., a number of content items the content creator generated previously, types of activities that the content creator has engaged in previously, past session data, past sharing data, one or more identifiers of sources of content that the content creator shared, an indicator that shared content included at least one of an image, rich media, or a hash tag, or a number of notifications received by the content creator). In some example embodiments, feedback features 210 include a type of feedback received previously, a count of each type of feedback, and the like.

The machine-learning algorithms utilize the training data 212 to find correlations among the identified features 202 that affect the outcome or assessment 220. In some example embodiments, the training data 212 includes known data for one or more identified features 202 and one or more outcomes, such as jobs searched by users, job suggestions selected for reviews, users changing companies, users adding social connections, users' activities online, etc.

With the training data 212 and the identified features 202, the machine-learning tool is trained at operation 214. The machine-learning tool appraises the value of the features 202 as they correlate to the training data 212. The result of the training is the trained machine-learning program 216.

When the machine-learning program 216 is used to perform an assessment, new data 218 is provided as an input to the trained machine-learning program 216, and the machine-learning program 216 generates the assessment 220 as output. For example, when a user performs a job search, a machine-learning program, trained with social network data, utilizes the user data and the job data, from the jobs in the database, to search for jobs that match the user's profile and activity. According to another example, when a user logs in to a web site associated with the online social networking system, a machine-learning program, trained with at least social network data, user behavior and activity, online content data, and online content feedback data, utilizes the various types of data to search for content that is both relevant to the user and is likely to generate feedback, which is of utility to the content creator.

Figure 3:
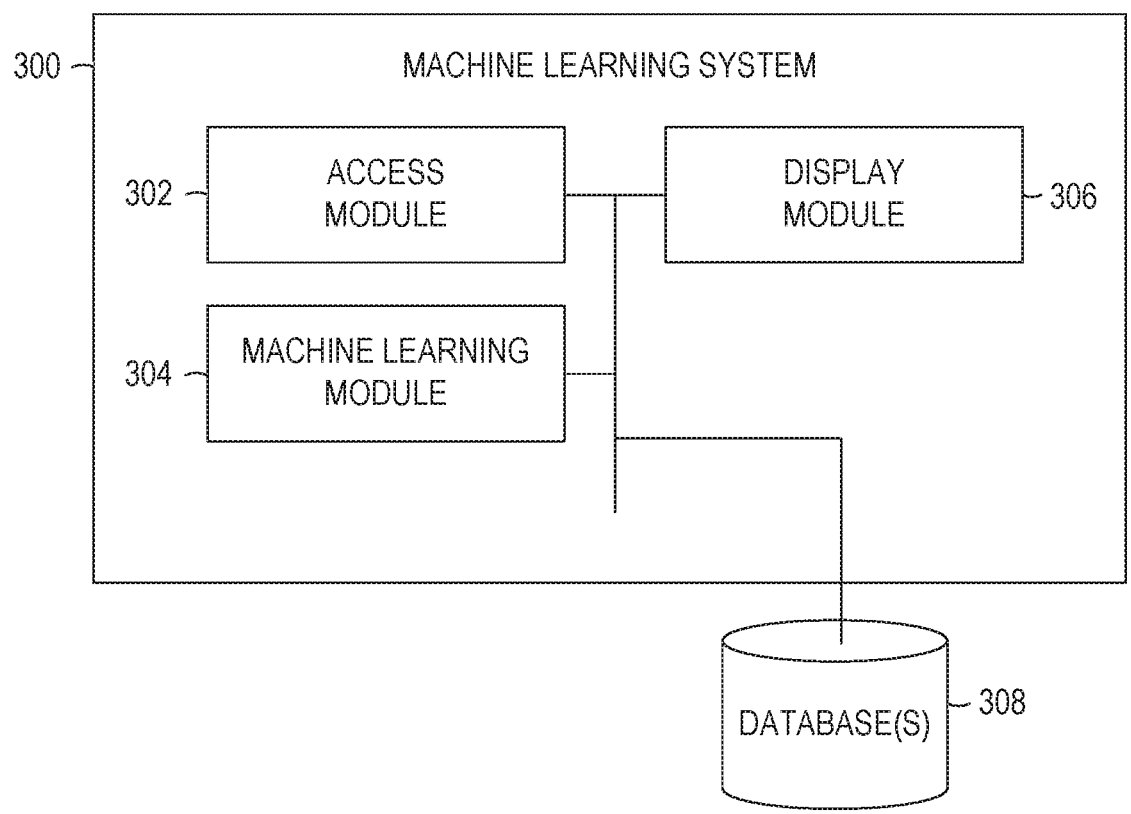
FIG. 3 is a block diagram illustrating components of a machine learning system, according to some example embodiments.

FIG. 3 is a block diagram illustrating components of the machine learning system 300, according to some example embodiments. As shown in FIG. 3, the machine learning system 300 includes an access module 302, a machine learning module 304, and a display module 306, all configured to communicate with each other (e.g., via a bus, shared memory, or a switch).

According to some example embodiments, the access module 302 accesses a relevance value. The relevance value may be accessed from a database record, or may be received from a module (e.g., the machine learning module 304) of the machine learning system 300. The relevance value identifies a level of relevance of a content item to a user. The content item is (or was) created by a content creator for publication on an online social networking service.

The machine learning module 304 generates a feedback sensitivity score associated with the content creator. The feedback sensitivity score is generated using a machine learning model that includes one or more machine learning algorithms. The machine learning model uses one or more feedback features that identify feedback signals received for one or more previously created content items. The one or more previously created content items may have been created by the content creator.

The machine learning module 304 also generates a ranking score for the content item created by the content creator. The ranking score may be generated based on the relevance value and a product between the feedback sensitivity score and a likelihood of the user providing a feedback signal in relation to the content item. The likelihood (e.g., a probability value) of the user providing the feedback signal in relation to the content item may be determined by the machine learning module 304. The probability value of the user providing the feedback signal in relation to the content item may be stored at and may be accessed from a database record.

The display module 306 causes display of the content item in a user interface of a client device associated with the user. The user interface displays the content item in relation to other content items based on the ranking score for the content item. An input pertaining to the content item received via the user interface causes improvement of the machine learning model based on updating the one or more feedback features used by the machine learning model to reflect (e.g., correspond to) the input pertaining to the content item received via the user interface.

In some example embodiments, the content item is selected, for display in the user interface, from among a plurality of content items based on the ranking score associated with the content item.

To perform one or more of its functionalities, the machine learning system 300 may communicate with one or more other systems. For example, an integration system may integrate the machine learning system 300 with one or more email servers, web servers, one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 308 (e.g., database 128, 130, 132, 136, or 138).

Figure 4:
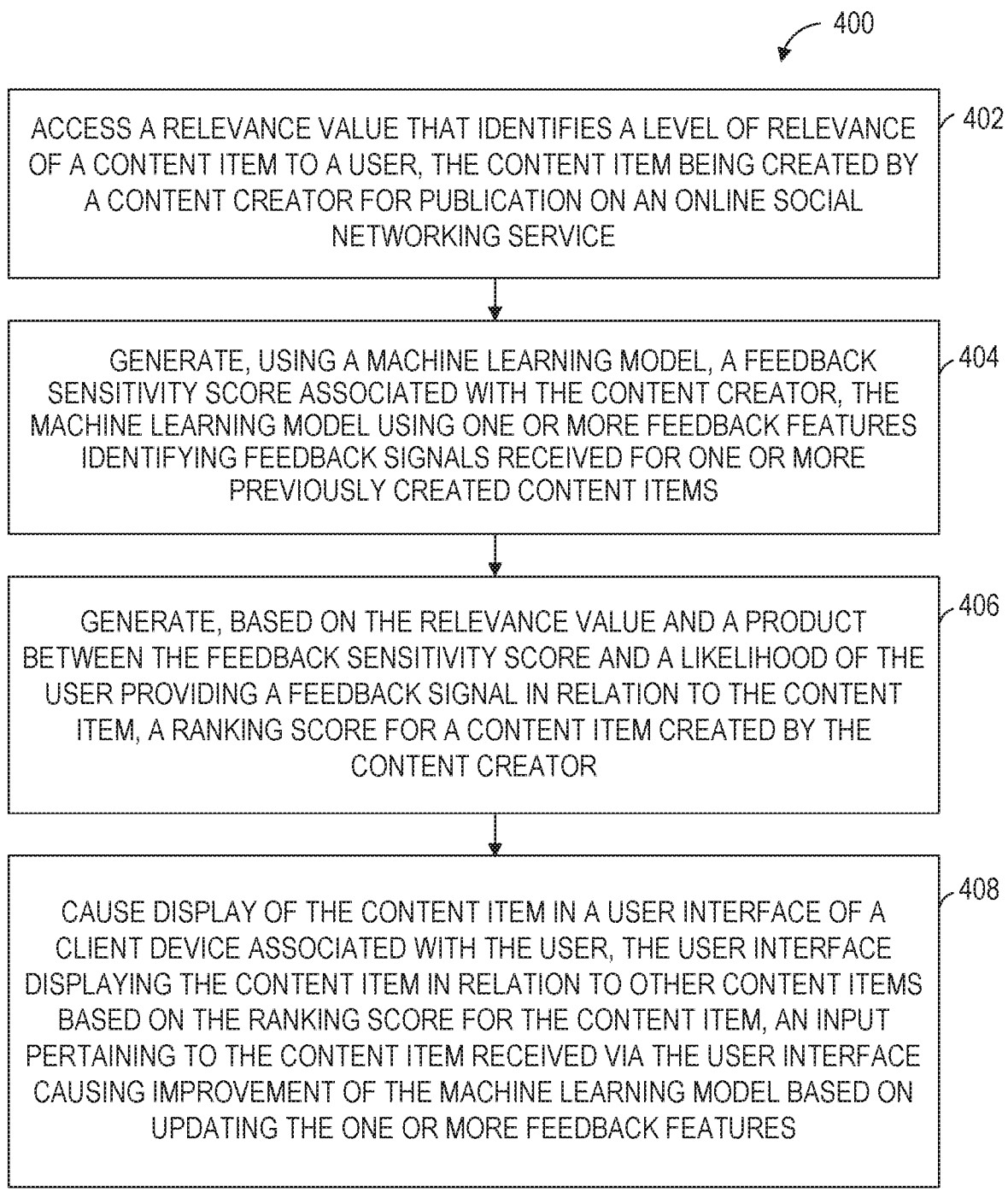
FIG. 4 is a flowchart illustrating a method for content-feedback-based machine learning to incent online content creation, according to some example embodiments.
Figure 6:
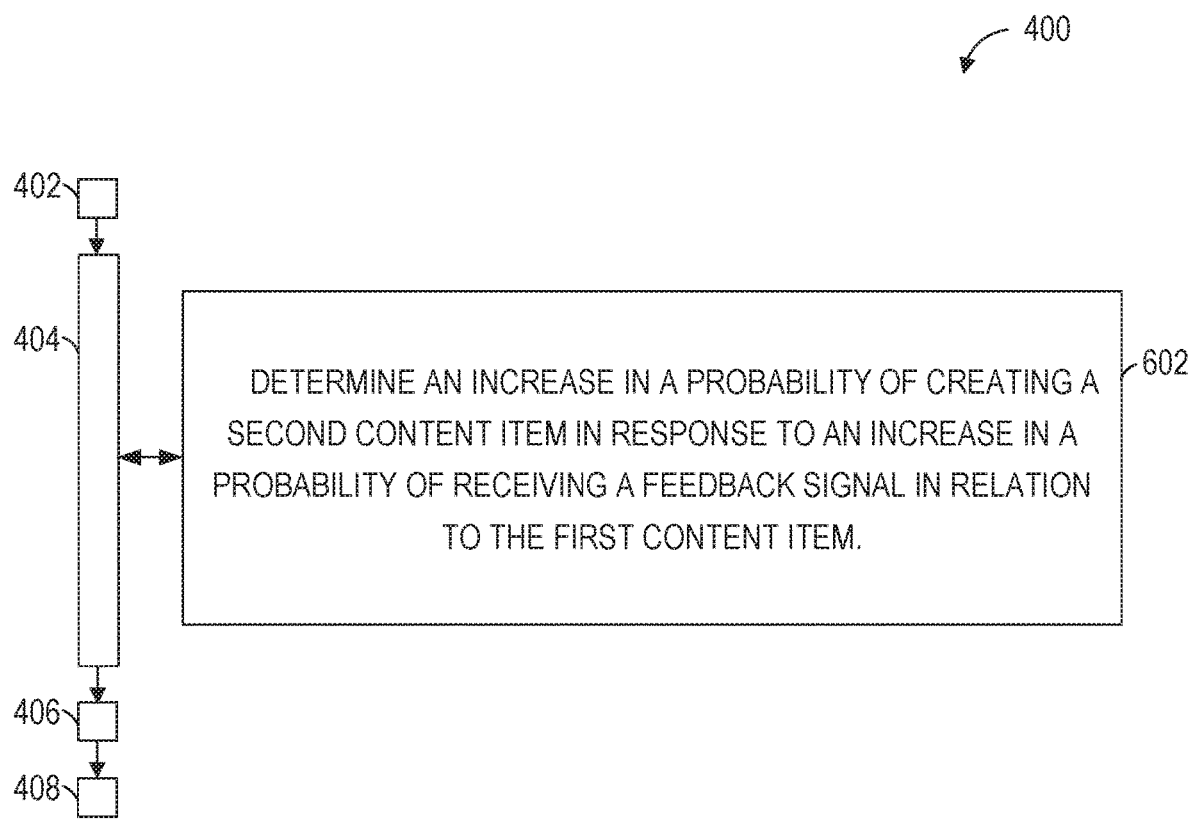
FIG. 6 is a flowchart illustrating a method for content-feedback-based machine learning to incent online content creation, and representing step 404 of FIG. 4 in more detail, according to some example embodiments.

FIGS. 4-6 are flowcharts illustrating a method for content-feedback-based machine learning to incent online content creation, according to some example embodiments. Operations in the method 400 illustrated in FIG. 4 may be performed using modules described above with respect to FIG. 3. As shown in FIG. 4, method 400 may include one or more of method operations 402, 404, 406, and 408, according to some example embodiments.

At operation 402, the access module 302 accesses (e.g., receives) a relevance value. The relevance value may be accessed from a database record, or may be received from a module (e.g., the machine learning module 304) of the machine learning system 300. The relevance value identifies a level of relevance of a content item to a user. The content item is (or was) created by a content creator for publication on an online social networking service. In some example embodiments, the relevance value is determined based on at least one of a probability value of a clickthrough by the user on the content item during a period of time, or a probability value of the user generating a feedback signal with respect to the content item during the period of time.

At operation 404, the machine learning module 304 generates a feedback sensitivity score associated with the content creator. The feedback sensitivity score is generated using a machine learning model that includes one or more machine learning algorithms. The machine learning model uses one or more feedback features that identify feedback signals received for one or more previously created content items. In some example embodiments, the feedback signal in relation to (e.g., for, with regards to, or pertaining to) the content item includes at least one of a sharing the content item, liking the content item, or commenting on the content item on the online social networking service. In some example embodiments, the one or more previously created content items are created by the content creator.

At operation 406, the machine learning module 304 generates a ranking score for the content item created by the content creator. The ranking score may be generated based on the relevance value and a product between the feedback sensitivity score and a likelihood of the user providing a feedback signal in relation to the content item. The likelihood (e.g., a probability value) of the user providing the feedback signal in relation to the content item is determined by the machine learning module 304. The probability value of the user providing the feedback signal in relation to the content item may be stored at and accessed from a database record.

At operation 408, the display module 306 causes display of the content item in a user interface of a client device associated with the user. The user interface displays the content item in relation to other content items based on the ranking score for the content item. For example, a first content item that is associated with a higher ranking score is displayed in the user interface before a second content item that is associated with lower ranking score. An input pertaining to the content item received via the user interface causes improvement of the machine learning model based on updating the one or more feedback features used by the machine learning model to reflect (e.g., correspond to) the input pertaining to the content item received via the user interface.

Further details with respect to the method operations of the method 400 are described below with respect to FIGS. 5 and 6.

As shown in FIG. 5, the method 400 includes operation 502, according to some example embodiments. Operation 502 may be performed before operation 402 of FIG. 4, in which the access module 302 accesses the relevance value.

At operation 502, the machine learning module 304 determines (e.g., generates) the relevance value based on a sum of a probability value of a clickthrough by the user on the content item, and a product between a probability value of the user sharing, liking, or commenting on the content item, and a downstream impact value that identifies an impact of the content item on a number of sharing, liking, or commenting instances based on a level of influence by the content creator on one or more users.

As shown in FIG. 6, the method 400 includes operations 602, according to some example embodiments. In some example embodiments, the content item is a first content item.

Operation 602 may be performed as part (e.g., a precursor task, a subroutine, or a portion) of operation 404 of FIG. 4, in which the machine learning module 304 generates a feedback sensitivity score associated with the content creator. At operation 602, the generating of the feedback sensitivity score, by the machine learning module 304, includes determining an increase in a probability of creating a second content item in response to an increase in a probability of receiving a feedback signal in relation to the first content item.

In some example embodiments, the probability of receiving the feedback signal in relation to the first content item is determined based on training the machine learning model using one or more features pertaining to at least one of user profiles or user behavior and activity associated with one or more members of the online social networking service.

In various example embodiments, the one or more features include at least one of a type of feedback received previously, a count of each type of feedback, a number of content items the content creator generated previously, types of activities that the content creator has engaged in previously, past session data, past sharing data, one or more identifiers of sources of content that the content creator shared, an indicator that shared content included at least one of an image, rich media, or a hash tag, a number of notifications received by the content creator, a number of connections the content creator has via the online social networking service, a number of active connections the content creator has via the online social networking service, identifiers of profile features, an identifier of language preference, a job title, a job seniority, a gender, a student identifier, a job seeker identifier, or a recruiter identifier.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
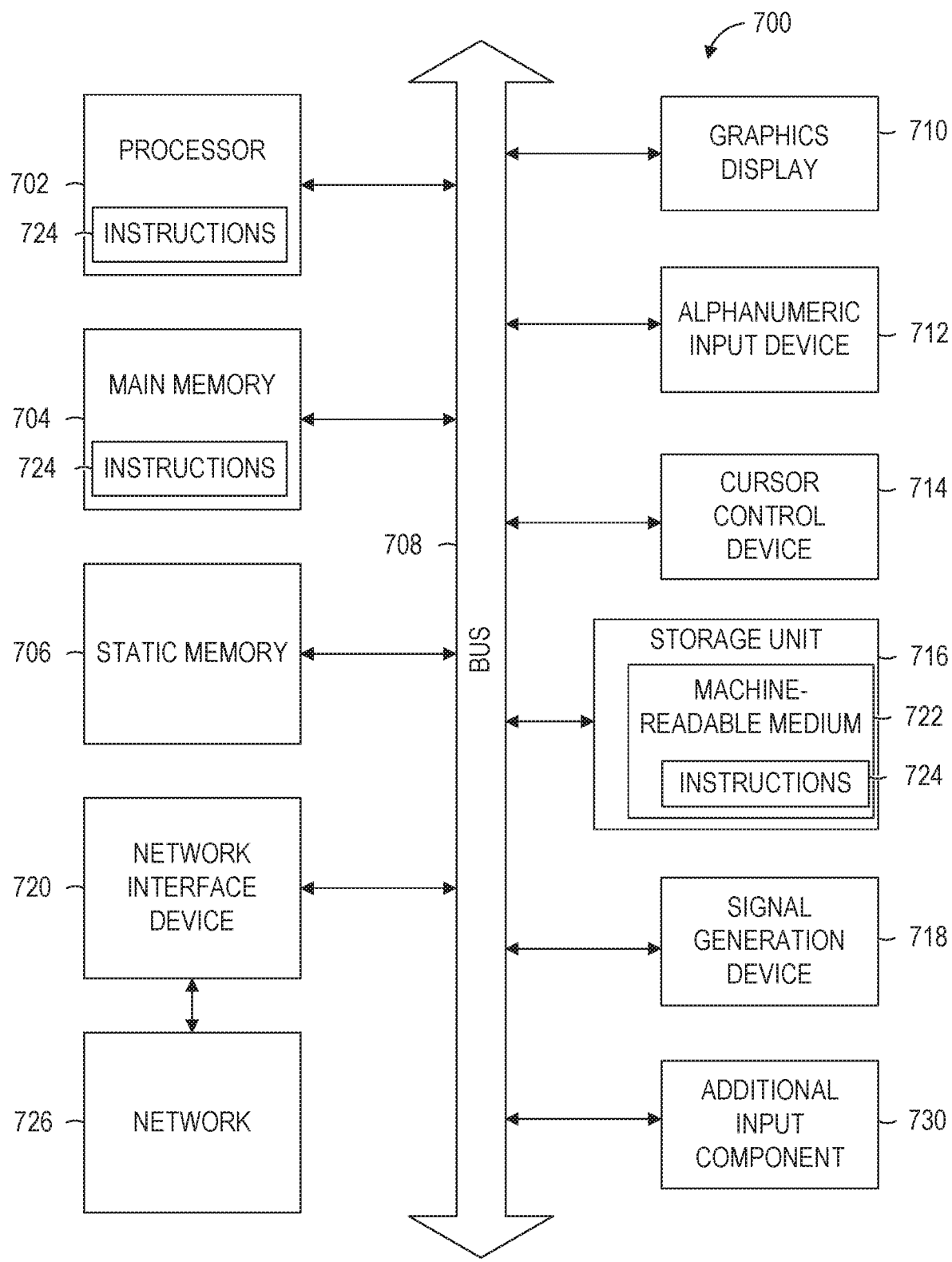
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media (e.g., tangible and non-transitory machine-readable media). The instructions 724 may be transmitted or received over the network 726 via the network interface device 720. For example, the network interface device 720 may communicate the instructions 724 using any one or more transfer protocols (e.g., hypertext transfer protocol (HTTP)).

In some example embodiments, the machine 700 may be a portable computing device, such as a smart phone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    accessing a relevance value, the relevance value identifying a level of relevance of a content item to a user, the content item being created by a content creator for publication on an online social networking service;
    generating, using one or more hardware processors and a machine learning model, a feedback sensitivity score associated with the content creator, the machine learning model using one or more feedback features identifying feedback signals received for one or more previously created content items;
    generating, based on the relevance value and a product between the feedback sensitivity score and a likelihood of the user providing a feedback signal in relation to the content item, a ranking score for the content item created by the content creator; and
    causing display of the content item in a user interface of a client device associated with the user, the user interface displaying the content item in relation to other content items based on the ranking score for the content item, an input pertaining to the content item received via the user interface causing improvement of the machine learning model based on updating the one or more feedback features used by the machine learning model.

2. The method of claim 1, wherein the feedback signal in relation to the content item includes at least one of a sharing the content item, liking the content item, or commenting on the content item on the online social networking service.

3. The method of claim 1, wherein the relevance value is determined based on at least one of a probability value of a clickthrough by the user on the content item during a period of time, or a probability value of the user generating a feedback signal with respect to the content item during the period of time.

4. The method of claim 1, further comprising:
    determining the relevance value based on a sum of a probability value of a clickthrough by the user on the content item, and a product between a probability value of the user sharing, liking, or commenting on the content item, and a downstream impact value that identifies an impact of the content item on a number of sharing, liking, or commenting instances based on a level of influence by the content creator on one or more users.

5. The method of claim 1, wherein the content item is a first content item, and wherein the generating of the feedback sensitivity score includes determining an increase in a probability of creating a second content item in response to an increase in a probability of receiving a feedback signal in relation to the first content item.

6. The method of claim 5, wherein the probability of receiving the feedback signal in relation to the first content item is determined based on training the machine learning model using one or more features pertaining to at least one of user profiles or user behavior and activity associated with one or more members of the online social networking service.

7. The method of claim 6, wherein the one or more features include at least one of a type of feedback received previously, a count of each type of feedback, a number of content items the content creator generated previously, types of activities that the content creator has engaged in previously, past session data, past sharing data, one or more identifiers of sources of content that the content creator shared, an indicator that shared content included at least one of an image, rich media, or a hash tag, a number of notifications received by the content creator, a number of connections the content creator has via the online social networking service, a number of active connections the content creator has via the online social networking service, identifiers of profile features, an identifier of language preference, a job title, a job seniority, a gender, a student identifier, a job seeker identifier, or a recruiter identifier.

8. A system comprising:
one or more hardware processors; and
a non-transitory machine-readable medium for storing instructions that, when executed by the one or more hardware processors, cause the one or more hardware processors to perform operations comprising:
accessing a relevance value, the relevance value identifying a level of relevance of a content item to a user, the content item being created by a content creator for publication on an online social networking service;
generating, using one or more hardware processors and a machine learning model, a feedback sensitivity score associated with the content creator, the machine learning model using one or more feedback features identifying feedback signals received for one or more previously created content items;
generating, based on the relevance value and a product between the feedback sensitivity score and a likelihood of the user providing a feedback signal in relation to the content item, a ranking score for the content item created by the content creator; and
causing display of the content item in a user interface of a client device associated with the user, the user interface displaying the content item in relation to other content items based on the ranking score for the content item, an input pertaining to the content item received via the user interface causing improvement of the machine learning model based on updating the one or more feedback features used by the machine learning model.

9. The system of claim 8, wherein the feedback signal in relation to the content item includes at least one of a sharing the content item, liking the content item, or commenting on the content item on the online social networking service.

10. The system of claim 8, wherein the relevance value is determined based on at least one of a probability value of a clickthrough by the user on the content item during a period of time, or a probability value of the user generating a feedback signal with respect to the content item during the period of time.

11. The system of claim 8, wherein the operations further comprise:
determining the relevance value based on a sum of a probability value of a clickthrough by the user on the content item, and a product between a probability value of the user sharing, liking, or commenting on the content item, and a downstream impact value that identifies an impact of the content item on a number of sharing, liking, or commenting instances based on a level of influence by the content creator on one or more users.

12. The system of claim 8, wherein the content item is a first content item, and wherein the generating of the feedback sensitivity score includes determining an increase in a probability of creating a second content item in response to an increase in a probability of receiving a feedback signal in relation to the first content item.

13. The system of claim 12, wherein the probability of receiving the feedback signal in relation to the first content item is determined based on training the machine learning model using one or more features pertaining to at least one of user profiles or user behavior and activity associated with one or more members of the online social networking service.

14. The system of claim 13, wherein the one or more features include at least one of a type of feedback received previously, a count of each type of feedback, a number of content items the content creator generated previously, types of activities that the content creator has engaged in previously, past session data, past sharing data, one or more identifiers of sources of content that the content creator shared, an indicator that shared content included at least one of an image, rich media, or a hash tag, a number of notifications received by the content creator, a number of connections the content creator has via the online social networking service, a number of active connections the content creator has via the online social networking service, identifiers of profile features, an identifier of language preference, a job title, a job seniority, a gender, a student identifier, a job seeker identifier, or a recruiter identifier.

15. A non-transitory machine-readable medium for storing instructions that, when executed by one or more hardware processors of a machine, cause the machine to perform operations comprising:
accessing a relevance value, the relevance value identifying a level of relevance of a content item to a user, the content item being created by a content creator for publication on an online social networking service;
generating, using one or more hardware processors and a machine learning model, a feedback sensitivity score associated with the content creator, the machine learning model using one or more feedback features identifying feedback signals received for one or more previously created content items;
generating, based on the relevance value and a product between the feedback sensitivity score and a likelihood of the user providing a feedback signal in relation to the content item, a ranking score for the content item created by the content creator; and
causing display of the content item in a user interface of a client device associated with the user, the user interface displaying the content item in relation to other content items based on the ranking score for the content item, an input pertaining to the content item received via the user interface causing improvement of the machine learning model based on updating the one or more feedback features used by the machine learning model.

16. The non-transitory machine-readable medium of claim 15, wherein the feedback signal in relation to the content item includes at least one of a sharing the content item, liking the content item, or commenting on the content item on the online social networking service.

17. The non-transitory machine-readable medium of claim 15, wherein the relevance value is determined based on at least one of a probability value of a clickthrough by the user on the content item during a period of time, or a probability value of the user generating a feedback signal with respect to the content item during the period of time.

18. The non-transitory machine-readable medium of claim 15, wherein the operations further comprise:
determining the relevance value based on a sum of a probability value of a clickthrough by the user on the content item, and a product between a probability value of the user sharing, liking, or commenting on the content item, and a downstream impact value that identifies an impact of the content item on a number of sharing, liking, or commenting instances based on a level of influence by the content creator on one or more users.

19. The non-transitory machine-readable medium of claim 15, wherein the content item is a first content item, and wherein the generating of the feedback sensitivity score includes determining an increase in a probability of creating a second content item in response to an increase in a probability of receiving a feedback signal in relation to the first content item.

20. The non-transitory machine-readable medium of claim 19, wherein the probability of receiving the feedback signal in relation to the first content item is determined based on training the machine learning model using one or more features pertaining to at least one of user profiles or user behavior and activity associated with one or more members of the online social networking service.

* * * * *